(12) United States Patent
Van Droogenbroeck et al.

(10) Patent No.: US 10,614,736 B2
(45) Date of Patent: *Apr. 7, 2020

(54) FOREGROUND AND BACKGROUND DETECTION METHOD

(71) Applicant: Université de Liège, Angleur (BE)

(72) Inventors: Marc Van Droogenbroeck, Overijse (BE); Marc Braham, Herve (BE); Sébastien Pierard, Angleur (BE)

(73) Assignee: UNIVERSITÉ DE LIÈGE, Angleur (BE)

( * ) Notice: Subject to any disclaimer, the term of this patent is extended or adjusted under 35 U.S.C. 154(b) by 97 days.

This patent is subject to a terminal disclaimer.

(21) Appl. No.: 15/983,238

(22) Filed: May 18, 2018

(65) Prior Publication Data

US 2019/0043403 A1      Feb. 7, 2019

(30) Foreign Application Priority Data

Aug. 4, 2017   (EP) .................................. 17184931

(51) Int. Cl.
 *G09G 3/20* (2006.01)
 *G06T 7/174* (2017.01)
 (Continued)

(52) U.S. Cl.
 CPC .................. *G09G 3/20* (2013.01); *G06T 7/11* (2017.01); *G06T 7/136* (2017.01); *G06T 7/174* (2017.01);
 (Continued)

(58) Field of Classification Search
 CPC ............ G09G 3/20; G09G 2300/0443; G09G 2300/0452; G06T 2207/20084;
 (Continued)

(56) References Cited

U.S. PATENT DOCUMENTS

| 9,042,662 B2 * | 5/2015 | Aerts | G06T 7/11 |
| | | | 382/224 |
| 2006/0045354 A1 * | 3/2006 | Hanna | G06K 9/00771 |
| | | | 382/224 |

(Continued)

OTHER PUBLICATIONS

P-M. Jodoin et al., "Overview and Benchmarking of Motion Detection Methods", Background Modeling and Foreground Detection for Video Surveillance, Chapter 24, pp. I-1-I-26, Jul. 2014, cited in the Specification.

(Continued)

*Primary Examiner* — John B Strege
(74) *Attorney, Agent, or Firm* — Jacobson Holman, PLLC.

(57) ABSTRACT

The present invention concerns a method for assigning a pixel to one of a foreground pixel set and a background pixel set. In this method, if a first condition is met the pixel is assigned to the background pixel set, and if the first condition is not met and a second condition is met, the pixel is assigned to the foreground pixel set. The method comprises a step (S100) of calculating a probability that the pixel belongs to a foreground-relevant object according to a semantic segmentation algorithm, the first condition is that this probability that the pixel belongs to a foreground-relevant object does not exceed a first predetermined threshold, and the second condition is that a difference between this probability that the pixel belongs to a foreground-relevant object and a baseline probability for the pixel equals or exceeds a second predetermined threshold.

16 Claims, 6 Drawing Sheets

(51) Int. Cl.
G06T 7/194 (2017.01)
G06T 7/11 (2017.01)
G06T 7/136 (2017.01)

(52) U.S. Cl.
CPC .... *G06T 7/194* (2017.01); *G06T 2207/10016* (2013.01); *G06T 2207/20081* (2013.01); *G06T 2207/20084* (2013.01); *G09G 2300/0443* (2013.01); *G09G 2300/0452* (2013.01)

(58) Field of Classification Search
CPC . G06T 2207/20081; G06T 2207/10016; G06T 2207/20224; G06T 2207/20076; G06T 7/136; G06T 7/194; G06T 7/174; G06T 7/11; G06T 7/277; G06T 7/254; G06T 7/215

See application file for complete search history.

(56) References Cited

U.S. PATENT DOCUMENTS

| 2012/0327172 | A1* | 12/2012 | El-Saban | G06K 9/00228 348/14.02 |
| 2015/0146917 | A1* | 5/2015 | Bernal | G06K 9/00771 382/103 |
| 2015/0187076 | A1* | 7/2015 | Lin | H04N 7/15 382/103 |
| 2018/0211393 | A1* | 7/2018 | Chen | G06T 7/194 |

OTHER PUBLICATIONS

T. Bouwmans, "Traditional and recent approaches in background modeling for foreground detection: An overview", Computer Science Review, vol. 11-12, pp. 31-66, May 2014, cited in the Specification.
C. Stauffer et al., "Adaptive background mixture models for real-time tracking", IEEE Int. Conf. Comput. Vision and Pattern Recogn. (CVPR), vol. 2. pp. 246-252, Jun. 1999, cited in the Specification.
O. Barnich et al., "viBe: A universal background subtraction algorithm for video sequences", IEEE Trans. Image Process., vol. 20, No. 6, pp. 1709-1724, Jun. 2011, cited in the Specification.
V. Jain et al., "Background Modeling Based on Subpixel Edges", IEEE Int. Conf. Image Process. (ICIP), vol. 6, pp. 321-324, Sep. 2007, cited in the Specification.
S. Zhang et al., "Dynamic Background Modeling and Subtraction Using Spatio-Temporal Local Binary Patterns", IEEE Int. Conf. Image process. (ICIP), pp. 1556-1559, Oct. 2008, cited in the Specification.
M. Chen et al., "Spatiotemporal Background Subtraction Using Minimum Spanning Tree and Optical Flow", Ear. Conf. Comput. Vision (ECCV), vol. 8695 of Lecture Notes Comp. Sci., pp. 521-534, Sep. 2014, cited in the Specification.
M. Braham et al., "A Physically Motivated Pixel-Based Model for Background Subtraction in 3D Images," in IEEE Int. Conf. 3D Imaging (IC3D), pp. 1-8, Dec. 2014, cited in the Specification.
T. Bouwmans et al., "On the Role and the Importance of Features for Background Modeling and Foreground Detection", CoRR, vol. abs/1611.09099, pp. 1-131, Nov. 2016, cited in the Specification.
S. Piérard et al., "A perfect estimation of a background image does not lead to a perfect background substraction: analysis of the upper bound on the performance". Int. Conf. Image Anal. and Process. (ICIAP), Workshop Scene Background Modeling and Initialization (SBMI). vol. 9281 of Lecture Notes Comp. Sci., pp. 527-534, Sep. 2015, cited in the Specification.
J. Long et al., "Fully Convolutional Networks for Semantic Segmentation", IEEE Int. Conf. Comput. Vision and Pattern Recogn. (CVPR), pp. 3431-3440, Jun. 2015, cited in the Specification.
S. Zheng et al., "Conditional Random Fields as Recurrent Neural Networks", IEEE Int. Conf. Comput. Vision (ICCV), pp. 1529-1537, Dec. 2015, cited in the Specification.
H. Zhao et al., "Pyramid Scene Parsing Network", CoRR, vol. abs/1612.01105, Dec. 2016, cited in the Specification.
L. Sevilla-Lara et al., "Optical Flow with Semantic Segmentation and Localized Layers", IEEE Int. Conf. Comput. Vision and Pattern Recogn. (CVPR), pp. 3889-3898, Jun. 2016, cited in the Specification.

* cited by examiner

FOREGROUND AND BACKGROUND DETECTION METHOD

TECHNICAL FIELD

The disclosure relates to a method for assigning a pixel to one of a foreground and a background pixel sets.

BACKGROUND

A major research area in computer vision is the field of motion detection. The aim of motion detection is to classify pixels according to whether they belong to such a moving object or not, filtering any pixels that may be misclassified, so as to detect moving objects in a scene. This task, which is solved in nature with apparent ease by even rudimentary animal vision systems, has turned out to be complex to replicate in computer vision.

In the field of computer vision, an image may be expressed as a plurality of picture elements, or pixels. Each single pixel in an image may have a position x in the image and a pixel value $\tilde{I}(x)$.

The position x may have any number of dimensions. For this reason, although the term "voxel" (for "volume element") is sometimes used instead of "pixel" in the field of 3D imaging, the term "pixel" should be understood broadly in the present disclosure as also covering such voxels and any picture element in images having any number of dimensions, including 3D images and/or multispectral images.

This position x may be limited to a finite domain, for instance if it is an image captured by a fixed imaging device. However, it may alternatively not be limited to a finite domain, for example if the image is captured by a moving imaging device, such as, for example, a satellite on-board camera.

The pixel value $\tilde{I}(x)$ may also have any number of dimensions. For example, in a monochromatic image, the pixel value $\tilde{I}(x)$ may be a scalar luminance value, but in polychromatic images, such as red-green-blue (RGB) component video images or hue saturation value (HSV) images, this pixel value $\tilde{I}(x)$ may be a multidimensional vector value.

Over the last two decades, a large number of background subtraction algorithms have been proposed for motion detection. Many of these background subtraction algorithms have been reviewed by P.-M. Jodoin, S. Piérard, Y. Wang, and M. Van Droogenbroeck in "Overview and benchmarking of motion detection methods", Background Modeling and Foreground Detection for Video Surveillance, chapter 24, Chapman and Hall/CRC, July 2014, and by T. Bouwmans in "Traditional and recent approaches in background modeling for foreground detection: An overview", Computer Science Review, vol. 11-12, pp. 31-66, May 2014.

Most background subtraction algorithms involve a comparison of low-level features, such as individual pixel values, in each image, with a background model, which may be reduced to an image free of moving objects and possibly adaptive. Pixels with a noticeable difference with respect to the background model may be assumed to belong to moving objects, and may thus be assigned to a set of foreground pixels, while the remainder may be assigned to a set of background pixels. For instance, the background subtraction algorithms disclosed by C. Stauffer and E. Grimson in "Adaptive background mixture models for real-time tracking", IEEE Int. Conf. Comput. Vision and Pattern Recogn. (CVPR), June 1999, vol. 2, pp. 246-252, and by O. Barnich and M. Van Droogenbroeck in "ViBe: A universal background subtraction algorithm for video sequences" in IEEE Trans. Image Process., vol. 20, no. 6, pp. 1709-1724, June 2011, classify pixels according to color components, whereas the background subtraction algorithms disclosed by V. Jain, B. Kimia, and J. Mundy in "Background modeling based on subpixel edges," IEEE Int. Conf. Image Process. (ICIP), September 2007, vol. 6, pp. 321-324, S. Zhang, H. Yao, and S. Liu in "Dynamic background modeling and subtraction using spatio-temporal local binary patterns", IEEE Int. Conf. Image Process. (ICIP), October 2008, pp. 1556-1559, M. Chen, Q. Yang, Q. Li, G. Wang, and M.-H. Yang in "Spatiotemporal background subtraction using minimum spanning tree and optical flow", Eur. Conf. Comput. Vision (ECCV), September 2014, vol. 8695 of Lecture Notes Comp. Sci., pp. 521-534, Springer, and M. Braham, A. Lejeune, and M. Van Droogenbroeck, "A physically motivated pixel-based model for background subtraction in 3D images," in IEEE Int. Conf. 3D Imaging (IC3D), December 2014, pp. 1-8, use, respectively, edges, texture descriptors, optical flow, or depth to assign pixels to the foreground or the background. A comprehensive review and classification of features used for background modeling was given by T. Bouwmans, C. Silva, C. Marghes, M. Zitouni, H. Bhaskar, and C. Frelicot in "On the role and the importance of features for background modeling and foreground detection," CoRR, vol. abs/1611.09099, pp. 1-131, November 2016.

While most of these low-level features can be computed with a very low computational load, they cannot address simultaneously the numerous challenges arising in real-world video sequences such as illumination changes, camouflage, camera jitter, dynamic backgrounds, shadows, etc. Upper bounds on the performance of pixel-based methods based exclusively on RGB color components were simulated by S. Piérard and M. Van Droogenbroeck in "A perfect estimation of a background image does not lead to a perfect background subtraction: analysis of the upper bound on the performance," in Int. Conf. Image Anal. and Process. (ICIAP), Workshop Scene Background Modeling and Initialization (SBMI). September 2015, vol. 9281 of Lecture Notes Comp. Sci., pp. 527-534, Springer. In particular, it was shown that background subtraction algorithms fail to provide a perfect segmentation in the presence of noise and shadows, even when a perfect background image is available.

Among the typical challenges for background subtraction algorithms, we can in particular consider camouflaged foreground objects, "ghosts", dynamic backgrounds and shadows and/or reflection effects.

A foreground object is considered to be "camouflaged" when its corresponding pixel values (e.g. color or luminance) are similar to those of the background. In this situation, background subtraction algorithms may erroneously assign the corresponding foreground pixels to the background, as false negatives. This may for instance take the form of color camouflage on images from color cameras, or of thermal camouflage on images from thermal cameras. Snow cover, for example, may lead to such camouflaging.

"Ghosting" is the phenomenon when a previously static object, which thus belonged to the background, starts moving. In this situation, because not only the pixel values of the pixels corresponding to the object change, but also those belonging to the background previously hidden by the object when it was static, these latter background pixels may be erroneously assigned to the foreground, as false positives.

Dynamic backgrounds are such backgrounds were there may be changes in pixel values, such as for instance a windblown leafy tree or a sea wave. In this situation, the corresponding background pixels may be erroneously assigned to the foreground, also as false positives.

Similarly, shadows and reflections may lead to background pixels being erroneously assigned to the foreground, as false positives, due to the associated changes in pixel values.

Other challenges that may lead background pixels to be erroneously assigned to the foreground as false positives are noisy images (for instance due to compression artifacts), camera jitter, automatic camera adjustments, slow framerates, panning, tilting and/or zooming, bad weather, gradual or sudden lighting changes, motion/insertion of background objects, residual heat stamps on thermal images, persistent background changes, clouds, smoke and highlights due to reflections.

Other challenges that may lead foreground pixels to be erroneously assigned to the background are fast moving objects, and foreground objects that become motionless and may thus be erroneously incorporated into the background.

SUMMARY

A first aspect of the disclosure relates to a method for assigning a pixel to one of a foreground pixel set and a background pixel set, more reliably and robustly than with background subtraction algorithms comparing a pixel value of the pixel with a pixel value of a corresponding pixel in a background model. In particular, according to this first aspect, the present disclosure seeks to address the above-mentioned challenges to background subtraction algorithms. For this purpose, the method according to this first aspect may comprise the steps of calculating a probability that a pixel of the selected image belongs to a foreground-relevant object according to a semantic segmentation algorithm, and assigning the pixel to the background pixel set if the probability that the pixel belongs to a foreground-relevant object does not exceed a first predetermined threshold, assigning the pixel to the foreground pixel set if the probability that the pixel belongs to a foreground-relevant object exceeds the first predetermined threshold and a difference between the probability that the pixel belongs to a foreground-relevant object and a baseline probability for the pixel equals or exceeds a second predetermined threshold.

Humans can easily delineate relevant moving objects with a high precision because they incorporate knowledge from the semantic level: they know what a car is, recognize shadows, distinguish between object motion and camera motion, etc. The purpose of semantic segmentation (also known as scene labeling or scene parsing) is to provide such information by labeling each pixel of an image with the class of its enclosing object or region. The task is difficult and requires the simultaneous detection, localization, and segmentation of semantic objects and regions. However, the advent of deep neural networks within the computer vision community and the access to large labeled training datasets have dramatically improved the performance of semantic segmentation algorithms, as described by J. Long, E. Shelhamer, and T. Darrell in "Fully convolutional networks for semantic segmentation", IEEE Int. Conf. Comput. Vision and Pattern Recogn. (CVPR), June 2015, pp. 3431-3440, by S. Zheng, S. Jayasumana, B. Romera-Paredes, V. Vineet, Z. Su, D. Du, C. Huang, and P. Torr in "Conditional random fields as recurrent neural networks", IEEE Int. Conf. Comput. Vision (ICCV), December 2015, pp. 1529-1537, and by H. Zhao, J. Shi, X. Qi, X. Wang, and J. Jia, "Pyramid scene parsing network," CoRR, vol. abs/1612.01105, December 2016. Semantic segmentation algorithms have thus begun to be used for specific computer vision tasks, such as optical flow estimation as described by L. Sevilla-Lara, D. Sun, V. Jampani, and M. J. Black in "Optical flow with semantic segmentation and localized layers", IEEE Int. Conf. Comput. Vision and Pattern Recogn. (CVPR), June 2016, pp. 3889-3898.

By leveraging information from a higher, semantic level, the method according to this first aspect of the disclosure can provide a more robust, reliable image segmentation into foreground and background than that provided by a background subtraction algorithm merely comparing low-level pixel values with a background model.

On one hand, the semantic level can thus be used to identify foreground-relevant objects, that is, objects belonging to semantic classes that can be expected to move, and thus belong to the foreground, and leverage this knowledge in the step of assigning the pixel to the background pixel set if the probability that the pixel belongs to a foreground-relevant object does not exceed a first predetermined threshold, so as to prevent false positives, that is, erroneously assigning pixels to the foreground pixel set due to, for example, dynamic backgrounds, ghosting, shadows and/or reflections, camera jitter, panning, tilting and/or zooming, bad weather, gradual or sudden lighting changes or background displacement, which usually affect the performances of conventional background subtraction algorithms.

On the other hand, the semantic level can also be used to identify whether the probability that a pixel belongs to such a foreground-relevant object is increased with respect to a baseline probability for that pixel, that may for instance correspond to a corresponding pixel in a semantic background model, in the step of assigning the pixel of the selected image to the foreground pixel set if the probability that the pixel belongs to a foreground-relevant object exceeds the first predetermined threshold and a difference between the probability that the pixel belongs to a foreground-relevant object and a baseline probability for the pixel equals or exceeds a second predetermined threshold, so as to prevent false negatives, that is, erroneously assigning pixels to the background, due to camouflage, i.e. when background and foreground share similar pixel values.

According to a second aspect of the present disclosure, the abovementioned method may further comprise a baseline updating step, wherein the baseline probability for the pixel is made equal to the probability that the pixel belongs to a foreground-relevant object calculated according to the semantic segmentation algorithm, if the pixel has been assigned to the background pixel set. Consequently, the baseline probability for the pixel can be updated for subsequent use with respect to corresponding pixels in other images using the information from the semantic level of this image. However, to avoid corrupting this baseline probability, for instance due to intermittent and slow-moving objects, a conservative updating strategy may be applied in which the baseline updating step is executed only randomly, according to a predetermined probability of execution, if the pixel has been assigned to the background pixel set.

According to a third aspect of the present disclosure, the method may further comprise a step of assigning the pixel to either the foreground pixel set or the background pixel set according to a background subtraction algorithm comparing a pixel value of the pixel with a pixel value of a corresponding pixel in a background model, and in particular a background subtraction algorithm based on at least one low-level image feature, if the probability that the pixel belongs to a foreground-relevant object exceeds the first predetermined threshold and the difference between the probability that the pixel belongs to a foreground-relevant object and the baseline probability for the pixel is lower than the second predetermined threshold. Consequently, any pixel that the abovementioned steps fail to assign to either the foreground pixel set or the background pixel set on the basis of the semantic segmentation algorithm may be assigned using a known background subtraction algorithm comparing a pixel value of the pixel with a pixel value of a corresponding pixel in a background model. In particular, the pixel may belong to an image and the background model be based on at least another, related image, such as for instance a previous image in a chronological sequence of images including the image to which the pixel belongs.

Indeed, according to a fourth aspect of the present disclosure, the pixel may belong to an image of a chronological sequence of images, in which case the baseline probability for the pixel may have been initialized as equal to a probability that a corresponding pixel in an initial image of the plurality of related images belongs to a foreground-relevant object, calculated according to the semantic segmentation algorithm. Consequently, the semantic knowledge from this initial image can be leveraged in at least initially setting the baseline probabilities with which the probabilities of corresponding pixels in subsequent images belonging to foreground-relevant objects are compared when determining whether those pixels are to be assigned to the foreground.

According to a fifth aspect of the present invention, the first and second predetermined thresholds may have been predetermined so as to optimize an F score of the method on a test image series. The F score of a detection method may be defined as the harmonic mean between precision and recall, wherein the precision is a ratio of true positives to the sum of true positives and false positives and the recall is a ratio of true positives to the sum of true positives and false negatives. In the present context, pixels that are correctly assigned to the foreground can be considered as true positives, pixels that are incorrectly assigned to the foreground represent false positives, and pixels that are incorrectly assigned to the background represent false negatives. Consequently, predetermining the first and second predetermined thresholds so as to optimize the F score of the abovementioned method on a test image series can ensure a good compromise between precision p and recall r when the method is subsequently carried out on the selected image.

However, in an alternative sixth aspect of the present invention, the first and second predetermined thresholds may have been heuristically predetermined based on, respectively, a false foreground detection rate of the background subtraction algorithm and a true foreground detection rate of the background subtraction algorithm. It has indeed been found by the inventors that the first and second predetermined thresholds with which the F score of the method on test image series can be optimized are strongly correlated with, respectively, the false foreground detection rate and the true foreground detection rate of the background subtraction algorithm applied in this method. Consequently, if those rates are known from earlier tests of the background subtraction algorithm, it becomes possible to ensure a good compromise between precision and recall when the method is carried out on the selected image, even without carrying out a time- and resource-consuming optimization of the F score of the method applying both the background subtraction algorithm and the semantic segmentation algorithm.

The present invention relates also to a data processing device programmed so as to carry out the image background recognition method of the invention; to a data storage medium comprising a set of instructions configured to be read by a data processing device to carry out an image background recognition method according to the invention; to a set of signals in magnetic, electromagnetic, electric and/or mechanical form, comprising a set of instructions for a data processing device to carry out an image background recognition method according to the invention; and/or to a process of transmitting, via magnetic, electromagnetic, electric and/or mechanical means, a set of instructions for a data processing device to carry out an image background recognition method according to the invention.

As "data storage medium" may be understood any physical medium capable of containing data readable by a reading device for at least a certain period of time. Examples of such data storage media are magnetic tapes and discs, optical discs (read-only as well as recordable or re-writable), logical circuit memories, such as read-only memory chips, random-access memory chips and flash memory chips, and even more exotic data storage media, such as chemical, biochemical or mechanical memories.

As "electromagnetic" any part of the electromagnetic spectrum is understood, from radio to UV and beyond, including microwave, infrared and visible light, in coherent (LASER, MASER) or incoherent form.

As "object" is understood any observable element of the real world, including animals and/or humans.

The above summary of some aspects of the invention is not intended to describe each disclosed embodiment or every implementation of the invention. In particular, selected features of any illustrative embodiment within this specification may be incorporated into an additional embodiment unless clearly stated to the contrary.

BRIEF DESCRIPTION OF THE DRAWINGS

The invention may be more completely understood in consideration of the following detailed description of various embodiments in connection with the accompanying drawings, in which.

While the invention is amenable to various modifications and alternative forms, specifics thereof have been shown by way of example in the drawings and will be described in detail. It should be understood, however, that the intention is not to limit aspects of the invention to the particular embodi-

DETAILED DESCRIPTION

For the following defined terms, these definitions shall be applied, unless a different definition is given in the claims or elsewhere in this specification.

All numeric values are herein assumed to be preceded by the term "about", whether or not explicitly indicated. The term "about" generally refers to a range of numbers that one of skill in the art would consider equivalent to the recited value (i.e. having the same function or result). In many instances, the term "about" may be indicative as including numbers that are rounded to the nearest significant figure.

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The following detailed description should be read with reference to the drawings in which similar elements in different drawings are numbered the same. The detailed description and the drawings, which are not necessarily to scale, depict illustrative embodiments and are not intended to limit the scope of the invention. The illustrative embodiments depicted are intended only as exemplary. Selected features of any illustrative embodiment may be incorporated into an additional embodiment unless clearly stated to the contrary.

In a set of images that may have been, for example, successively captured by an imaging device at times t following a time series, each image may be formed by a plurality of pixels, each single pixel in an image having a dedicated pixel position x and a pixel value $\tilde{I}(x)$. For ease of understanding, in the accompanying drawings, the pixel position x is shown as two-dimensional, but it could have any number of dimensions. For 3D images, for instance, the pixel position x may have three dimensions. The pixel value $\tilde{I}(x)$ in the illustrated embodiment is a three-dimensional vector, in the form of RGB- or HSV-triplets for obtaining a polychromatic image. In alternative embodiments, it could however have any other number of dimensions.

A semantic segmentation algorithm may be applied to each image in order to calculate, for each pixel position x and time t, a real-valued vector $\vec{v}_t(x)=[v_t^1(x), v_t^2(x), \ldots, v_t^N(x)]$, where $v_t^i(x)$ denotes a score for each class $c_i$ of a set $C=[c_1, c_2, \ldots, c_N]$ of N disjoint classes of objects. A set of probabilities $p_t(x \in c_i)$ that the pixel at pixel position x and time t belongs to each class $c_i$ of the set C may be calculated by applying a softmax function to the scores $v_t^i(x)$.

Among the N disjoint classes of objects of set C, a subset R may correspond to foreground-relevant objects, that is, objects relevant to motion detection. For instance, if the images relate to a street scene, these foreground-relevant objects may comprise potentially mobile objects like vehicles, people and animals, but not typically immobile objects like trees or buildings. Using the semantic segmentation algorithm it is thus possible to calculate an aggregated probability $$p_{S,t}(x) = p_t(x \in R) = \sum_{c_i \in R} p_t(x \in c_i)$$

that the pixel at pixel position x and time t belongs to a foreground-relevant object. It may be possible to consider different subsets R, possibly with different numbers of disjoint classes of foreground-relevant objects, for different areas of an image. For instance, when the image shows both a road and a walking path, the subset R may include just people and animals as foreground-relevant object classes in the area of the walking path, but also vehicles in the area of the road.

Figure 1:
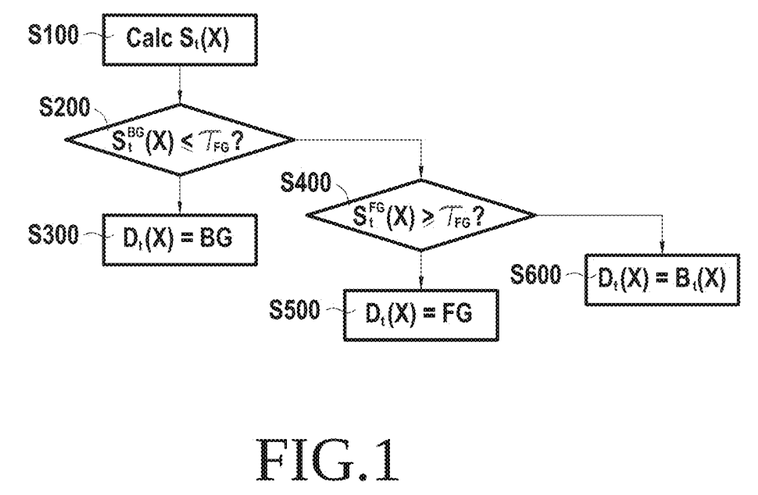
FIG. 1 is a flowchart illustrating a core routine of a method according to an aspect of the present disclosure.

This probability $p_{S,t}(x)$ that the pixel at pixel position x and time t belongs to a foreground-relevant object according to the semantic segmentation algorithm can be used in a method for assigning pixels to foreground and background pixel sets in each image of the set of images. FIG. 1 shows a flowchart illustrating a core routine of this method, wherein the pixel at pixel position x and time t is assigned to either the foreground pixel set or the background pixel set. In a first step S100, the probability $p_{S,t}(x)$ that the pixel at pixel position x and time t belongs to a foreground-relevant object is calculated using the semantic segmentation algorithm. In a second step S200, it is determined whether this probability $p_{S,t}(x)$ is lower than or equal to a first predetermined threshold $\tau_{BG}$. If the result of this comparison is positive, and it is thus determined that the probability $p_{S,t}(x)$ that the pixel at pixel position x and time t belongs to a foreground-relevant object according to the semantic segmentation algorithm does not exceed the first predetermined threshold $\tau_{BG}$, it is considered unlikely that the pixel at pixel position x and time t belongs to a potentially mobile object, and the pixel at pixel position x and time t is thus assigned to the background in step S300. Using a binary variable $D \in [BG, FG]$, wherein the value BG indicates a background pixel and the value FG indicates a foreground pixel, this can be expressed as a first rule:

$$S_t^{BG}(x) \le \tau_{BG} \rightarrow D_t(x) = BG$$

wherein $S_t^{BG}(x)$ denotes a signal that equals the probability $p_{S,t}(x)$, and $D_t(x)$ denotes the value of the binary variable D for the pixel at pixel position x and time t. This first rule provides a simple way to address the challenges of illumination changes, dynamic backgrounds, ghosts and strong shadows, which severely affect the performances of conventional background subtraction algorithms by erroneously assigning background pixels to the foreground pixel set.

On the other hand, if in step S200 it is determined that the probability $p_{S,t}(x)$ is not lower than or equal to a first predetermined threshold $\tau_{BG}$, in the next step S400 it is determined whether a difference $S_t^{FG}(x) = p_{S,t}(x) - M_t(x)$ is at least equal to a second predetermined threshold $\tau_{FG}$, wherein $M_t(x)$ denotes a baseline probability for pixel position x and time t. This baseline probability $M_t(x)$ corresponds to a semantic model of the background for pixel position x and time t. It may have been initialized as equal to the probability $p_{S,0}(x)$ that a corresponding pixel at pixel position x and time 0, that is, in an initial image of the set of related images, belongs to a foreground-relevant object according to the semantic segmentation algorithm. It may then have been updated according to the following update strategy at each subsequent time step:

$$D_t(x) = FG \rightarrow M_{t+1}(x) = M_t(x)$$

$$D_t(x) = BG \rightarrow_\alpha M_{t+1}(x) = p_{S,t}(x)$$

$$\rightarrow_{1-\alpha} M_{t+1}(x) = M_t(x)$$

wherein $\rightarrow_\alpha$ denotes a predetermined probability α of execution, which may be set, for example, to 0.00024.

Therefore, the value of the baseline probability $M_{t+1}(x)$ for pixel position x and the next time step t+1 is maintained equal to the baseline probability $M_t(x)$ for a corresponding pixel at time step t, and only updated randomly, according to the predetermined probability of execution p, with the value of the probability $p_{S,t}(x)$, if $D_t(x)=BG$, that is, if the pixel at pixel position x and time t has been assigned to the background pixel set.

The random determination, with predetermined probability α of execution, of whether the baseline probability $M_t(x)$ for pixel position x is to be updated, may be carried out using a random number generator. However, since such random numbers cannot be provided by a deterministic computer, a pseudorandom number generator may be used instead with properties similar to those of a true random number generator. Another alternative is the use of a large look-up list of previously generated random or pseudorandom numbers.

If the result of the comparison at step S400 is positive and it is thus determined that the difference $S_t^{FG}(x)$ is indeed equal to or higher than this second predetermined threshold $\tau_{FG}$, it is considered that there has been a significant increase in the probability $p_{S,t}(x)$ for the pixel at pixel position x and time t with respect to that to be expected according to the semantic model, and in the next step S500 the pixel at pixel position x and time t is thus assigned to the foreground pixel set. This can be expressed as a second rule:

$$S_t^{FG}(x) \geq \tau_{BG} \rightarrow D_t(x)=FG$$

This second rule can prevent to a large extent that foreground pixels that are camouflaged, that is, that have similar pixel values to the background, be erroneously assigned to the background, which is also a challenge for conventional background subtraction algorithms.

However, semantic segmentation alone may not suffice to distinguish between foreground and background, for instance in the case in which a foreground-relevant object (e.g. a moving car) moves in front of a stationary object of the same semantic, foreground-relevant object (e.g. a parked car). Since both objects belong to the same foreground-relevant object class, the probability $p_{S,t}(x)$ will not significantly increase as the moving object moves in front of the stationary object at pixel position x and time t.

To address such a situation, if the result of the comparison at step S400 is negative, that is, if the probability $S_t^{BG}(x)$ exceeds first predetermined threshold $\tau_{BG}$ and the difference $S_t^{FG}(x)$ is lower than the second predetermined threshold $\tau_{FG}$, a third rule is applied in the next step S600, assigning the pixel at pixel position x and time t to either the foreground pixel set or the background pixel set according to a conventional background subtraction algorithm comparing a pixel value $\tilde{I}(x)$ of the pixel at pixel position x and time t with a pixel value of a corresponding pixel in a background model based on at least another image of the plurality of related images. This can be expressed as a third rule:

$$D_t(x)=B_t(x)$$

wherein $B_t(x) \in [BG,FG]$ denotes the result from the background subtraction algorithm.

Figure 2:
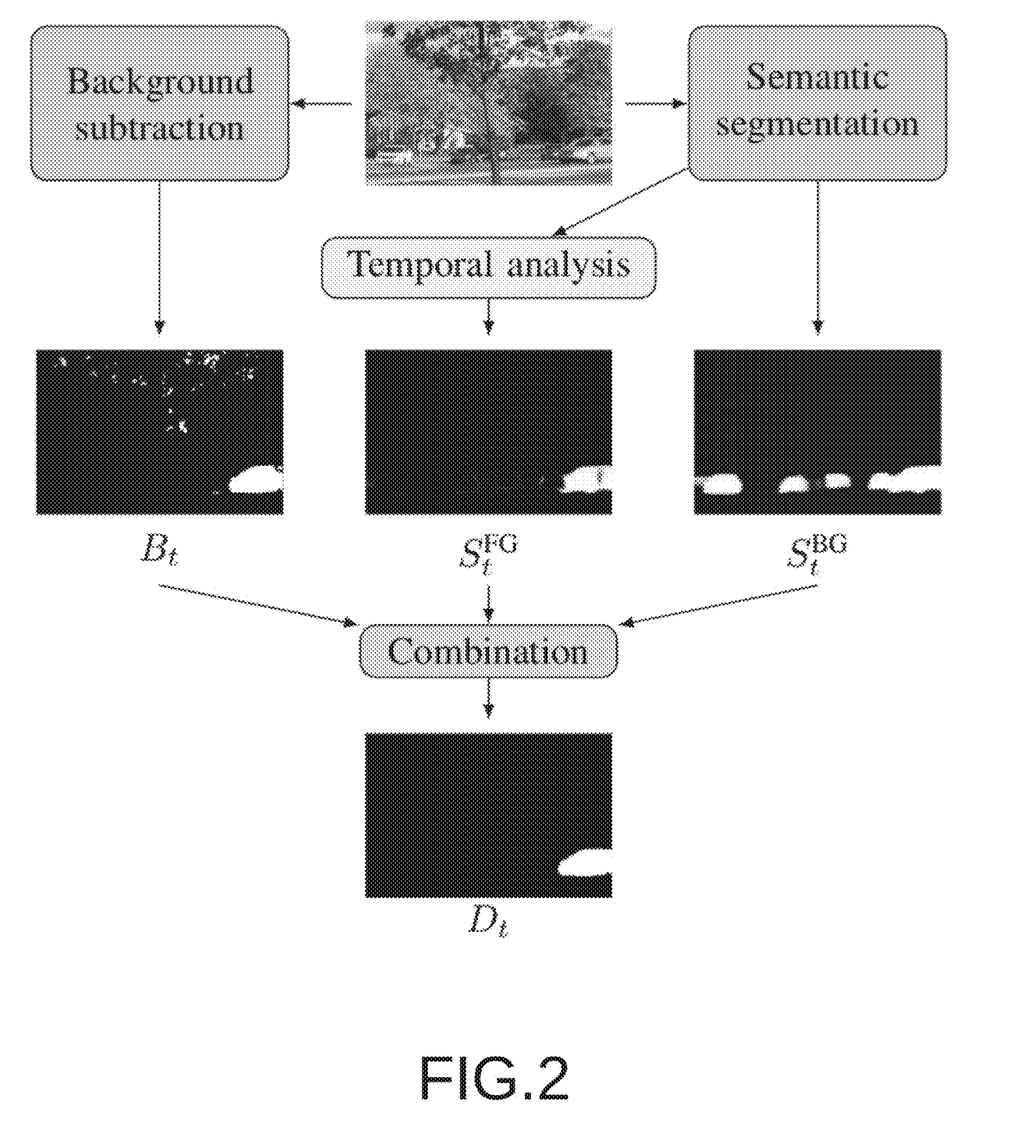
FIG. 2 is a functional scheme illustrating how the results of a semantic segmentation algorithm and a background subtraction algorithm are combined in the core routine of FIG. 1.

FIG. 2 thus illustrates how the three signals $S_t^{BG}(x)$, $S_t^{FG}(x)$ and $B_t(x)$ can be obtained and applied in combination, using the abovementioned three rules, for foreground and background detection. How these signals are combined can also be summarized with the following table:

TABLE 1

Foreground and background detection according to the three rules of the method

| $B_t(x)$ | $S_t^{BG}(x) \leq \tau_{BG}$ | $S_t^{FG}(x) \geq \tau_{BG}$ | $D_t(x)$ |
|---|---|---|---|
| BG | false | false | BG |
| BG | false | true | FG |
| BG | true | false | BG |
| BG | true | true | X |
| FG | false | false | FG |
| FG | false | true | FG |
| FG | true | false | BG |
| FG | true | true | X |

If the first predetermined threshold $\tau_{BG}$ is set lower than the second predetermined threshold $\tau_{FG}$, the two situations denoted with "X" on Table 1 above cannot effectively be encountered.

Because the first rule only assigns pixels to the background pixel set, raising the first predetermined threshold $\tau_{BG}$ so that the first rule is applied more frequently can only decrease the True Positive Rate TPR, that is the rate at which pixels are correctly assigned to the foreground, and the False Positive Rate FPR, that is the rate at which pixels are erroneously assigned to the foreground pixel set. On the other hand, because the second rule only assigns pixels to the foreground pixel set, decreasing the second predetermined threshold $\tau_{FG}$ so that the second rule is applied more frequently can only increase the True Positive Rate TPR and the False Positive Rate FPR. Ideally, the first predetermined threshold $\tau_{BG}$ and second predetermined threshold $\tau_{FG}$ are thus to be set at the level that achieves the best compromise between the highest possible True Positive Rate TPR and the lowest possible False Positive Rate FPR.

One first alternative for setting the first predetermined threshold $\tau_{BG}$ and second predetermined threshold $\tau_{FG}$ is to perform tests on test image sequences using the abovementioned method with various different values for the first predetermined threshold $\tau_{BG}$ and second predetermined threshold $\tau_{FG}$, and select the duple of values for these thresholds resulting, for given background subtraction and semantic segmentation algorithms, in the best overall F score, that is, the highest harmonic mean between precision and recall, wherein the precision is a ratio of true positives (instances of pixels correctly assigned to the foreground pixel set) to the sum of true positives and false positives (instances of pixels erroneously assigned to the foreground pixel set) and the recall is a ratio of true positives to the sum of true positives and false negatives (instances of pixels erroneously assigned to the background pixel set). This can be performed as a grid search optimization.

The inventors have carried out such tests on 53 video sequences, organized in 11 categories, of the CDNet dataset presented by Y. Wang, P.-M. Jodoin, F. Porikli, J. Konrad, Y. Benezeth, and P. Ishwar in "CDnet 2014: An expanded change detection benchmark dataset", IEEE Int. Conf. Comput. Vision and Pattern Recogn. Workshops (CVPRW), pages 393-400, Columbus, Ohio, USA, June 2014, applying the presently disclosed method using 34 different background subtraction algorithms and, as semantic segmentation algorithm, the deep architecture PSPNet disclosed by H. Zhao, J. Shi X. Qi, X. Wang and J. Jia in "Pyramid scene parsing network", CoRR, vol. abs/1612.01105, trained on the ADE20K dataset presented by B. Zhou, H. Zhao, X. Puig, S. Fidler, A. Barriuso and A. Torralba in "Semantic understanding of scenes through the ADE20K dataset", CoRR, vol. abs/1608.05442, August 2016, to extract semantics, using the PSPNet50 ADE20K model made publicly available by H. Zhao, running at approximately 7 fps at a 473×473 pixel image resolution on an NVIDIA® GeForce® GTX Titan X GPU. The last layer of this PSPNet architecture assigns to each pixel a score for each class $c_i$ of a set $C=[c_1, c_2, \ldots c_N]$ of N=150 disjoint object classes. In these tests, the selected subset of foreground-relevant object classes is R=[person, car cushion, box, book, boat, bus, truck, bottle, van, bag, bicycle], corresponding to the semantics of CDNet foreground objects.

Figure 3A:
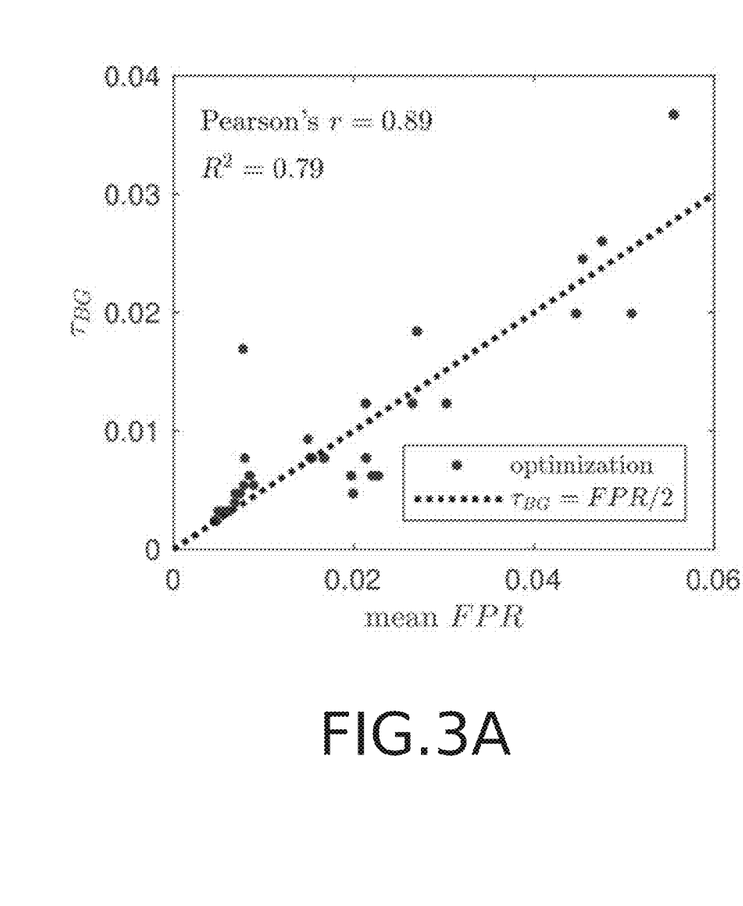
FIGS. 3A and 3B are graphs charting the positive correlations between the False Positive Rate FPR and True Positive Rate TPR of the background subtraction algorithm and the optimum values for, respectively, a first predetermined threshold $\tau_{BG}$ and a second predetermined threshold $\tau_{FG}$ in the method of FIG. 2.
Figure 3B:
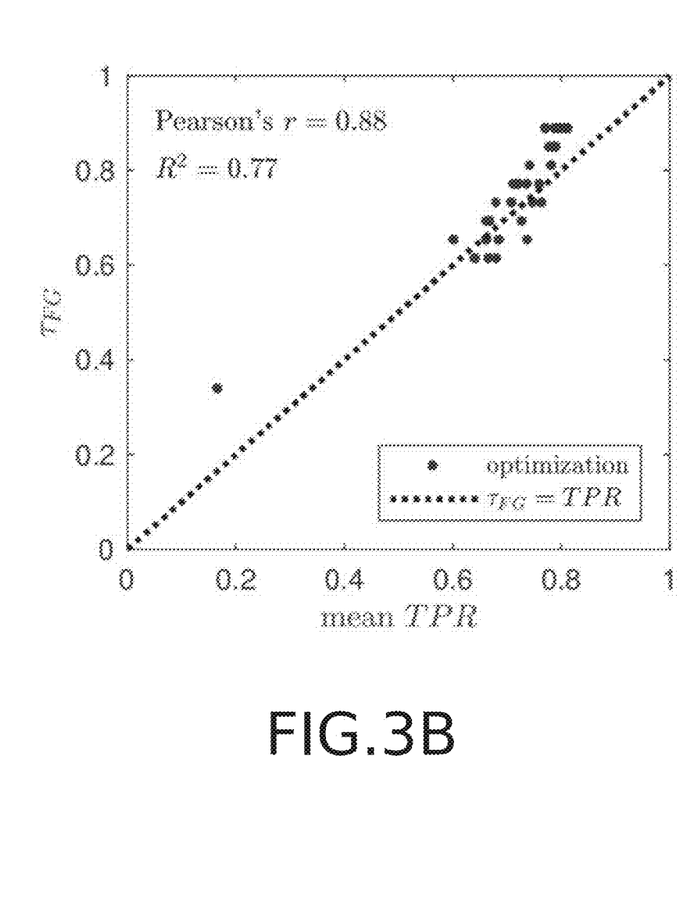

During these tests, it was found that there is a close correlation between the False Positive Rate FPR and True Positive Rate TPR of the background subtraction algorithm used in the third rule of the abovementioned method and, respectively, the first predetermined threshold $\tau_{BG}$ and second predetermined threshold $\tau_{FG}$ that achieve the best overall F score when applied in the first and second rules of the same method, as shown in FIGS. 3A and 3B.

Consequently, a second alternative approach is to heuristically set the first predetermined threshold $\tau_{BG}$ and second predetermined threshold $\tau_{FG}$ based on, respectively, the False Positive Rate FPR and True Positive Rate TPR of the background subtraction algorithm to be used in the third rule of the method. For instance, the first predetermined threshold $\tau_{BG}$ may be set as half the False Positive Rate FPR of the background subtraction algorithm, and the second predetermined threshold $\tau_{FG}$ as equal to the True Positive Rate TPR of the background subtraction algorithm. Since the background subtraction algorithm should, by definition, perform better than a random classifier, its False Positive Rate FPR should be lower than its True Positive Rate TPR, thus ensuring that the first predetermined threshold $\tau_{BG}$ is also lower than the second predetermined threshold $\tau_{FG}$.

According to a third alternative approach, the first predetermined threshold $\tau_{BG}$ and second predetermined threshold $\tau_{FG}$ may be set to default values, corresponding for example to the arithmetic mean of the values for these thresholds resulting in the best overall F score for each of the best-performing five background subtraction algorithms in the 2014 CDNet ranking, with the same semantic segmentation algorithm.

Figure 4:
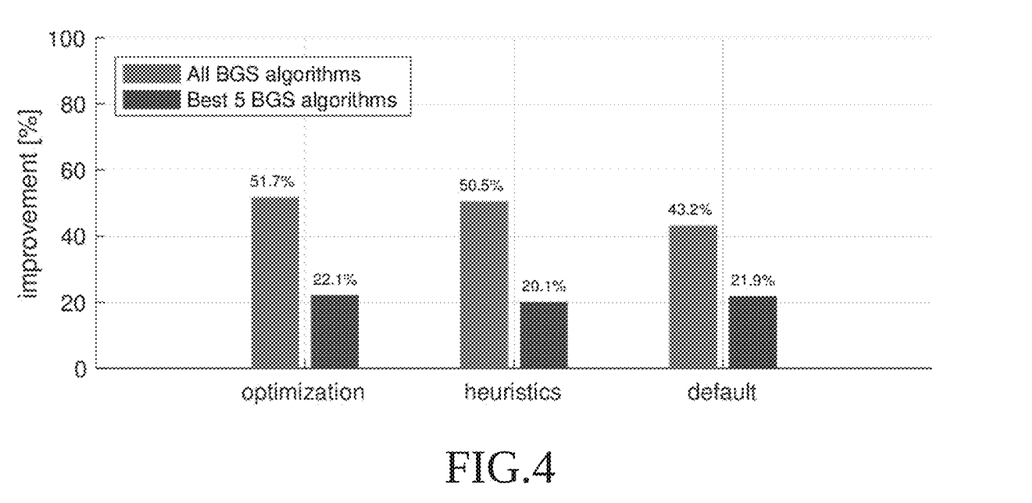
FIGS. 4 to 6 are graphs charting the improvement achieved by the method of FIG. 1 over a background subtraction algorithm used therein.

Each one of these three alternative approaches has been tested and found to provide very significant improvements over the results of the underlying background subtraction algorithm on its own. FIG. 4 illustrates this improvement, defined as one minus the error rate of the method combining background subtraction with semantic segmentation divided by the error rate of the background subtraction algorithm on its own, for each one of these three approaches. More specifically, FIG. 4 illustrates the mean improvement, measured on the overall CDNet dataset, both for the entire set of 34 background subtraction algorithms, and for only the 5 best-performing background subtraction algorithms. As can be seen on this figure, the first approach offers a very significant improvement, even over the background subtraction algorithms that already performed best, and this improvement is hardly decreased with the second and third alternative approaches.

Figure 5:
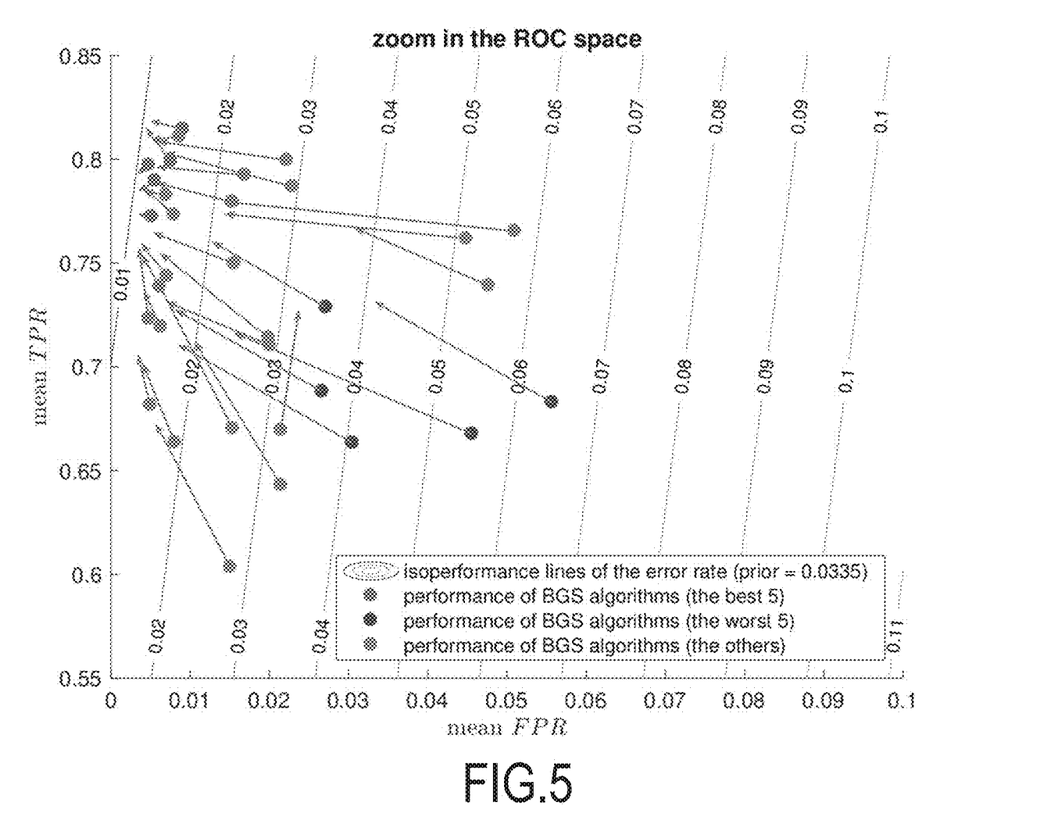

FIG. 5 illustrates the improvement, with respect to each background subtraction algorithm of the abovementioned set of 34 different background subtraction algorithms, in terms of change in the mean True Positive Rate TPR and False Positive Rate FPR. As can be seen there, the present method tends to reduce significantly the False Positive Rate FPR, while simultaneously increasing the True Positive Rate TPR.

Figure 6:
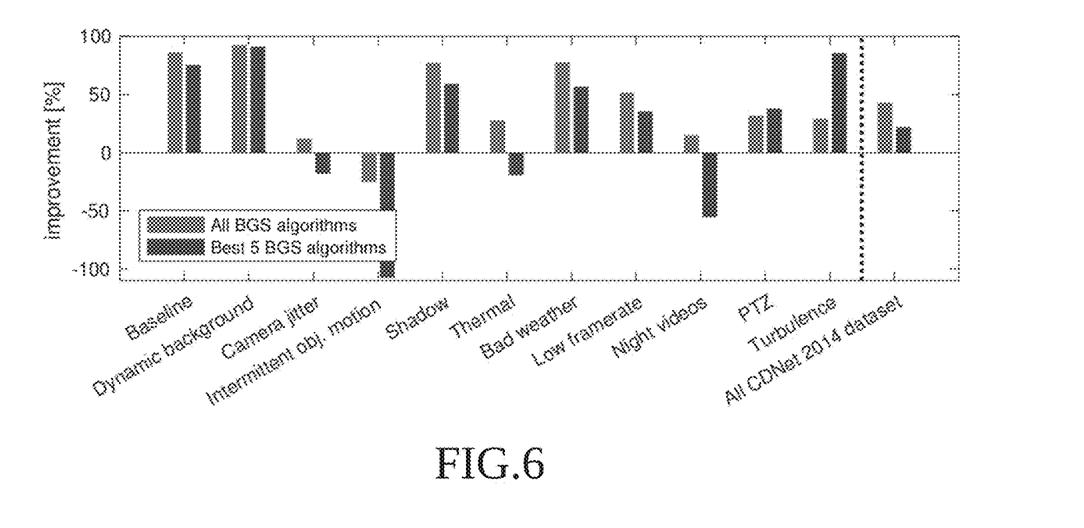

FIG. 6 illustrates the mean improvement, both for all 34 different background subtraction algorithms and for the 5 best-performing, per category of video sequence, in the 11 categories of the CDNet dataset: "Baseline", "Dynamic background", "Camera jitter", "Intermittent object motion", "Shadow", "Thermal", "Bad weather", "Low framerate", "Night videos", "Pan-Tilt-Zoom Camera" and "Turbulence". Particularly good improvements can be observed for the "Baseline", "Dynamic background", "Shadow" and "Bad weather" categories. With respect to the "Thermal" and "Night videos" categories, it must be noted that the ADE20K dataset used to teach the semantic segmentation algorithm did not include images of these types, which may explain the less good results for those categories.

Figure 7:
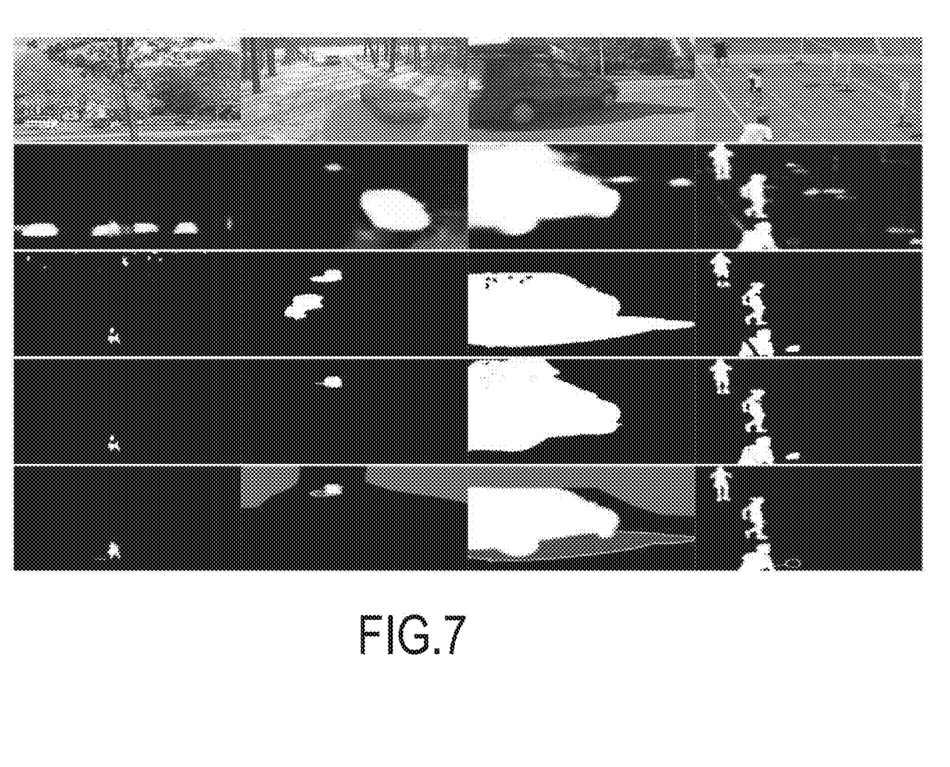
FIG. 7 illustrates the outputs of a semantic segmentation algorithm, a background subtraction algorithm and a method combining both for various video sequences in difficult scenarios.

FIG. 7 illustrates the benefits of the method according to the present disclosure in four different scenarios of real-world surveillance tasks. From left to right, the four columns correspond, respectively, to scenarios with dynamic background, risk of ghosts, strong shadows, and camouflage effects. From the top down, the five rows illustrate a frame of the corresponding video sequence, the probability $p_{S,t}(x)$ for each pixel, the output of the IUTIS-5 background subtraction algorithm described by S. Bianco, G. Ciocca and R. Schettini in "How far can you get by combining change detection algorithms?", CoRR, vol. abs/1505.02921, 2015, the output of the presently-disclosed method, applying the IUTIS-5 background subtraction algorithm in its third rule, and the ground truth. As can be seen, with respect to the IUTIS-5 background subtraction algorithm on its own, the presently-disclosed method greatly reduces the number of false positive foreground pixel detections caused by dynamic backgrounds, ghosts and strong shadows, while at the same time mitigating camouflage effects.

The presently disclosed method may be carried out with assistance of a data processing device, such as, for example, a programmable computer like the abovementioned NVIDIA® GeForce® GTX Titan X GPU, connected to an imaging device providing a video sequence of successive images. In such a case, the data processing device may receive instructions for carrying out this method using a data storage medium, or as signals in magnetic, electromagnetic, electric and/or mechanical form.

The presently disclosed method may, for example, be applied to video-surveillance, professional and/or consumer digital still and/or video cameras, computer and videogame devices using image capture interfaces, satellite imaging and Earth observation, automatic image analysis and/or medical imaging systems or may be included in a smartphone.

Figure 8:
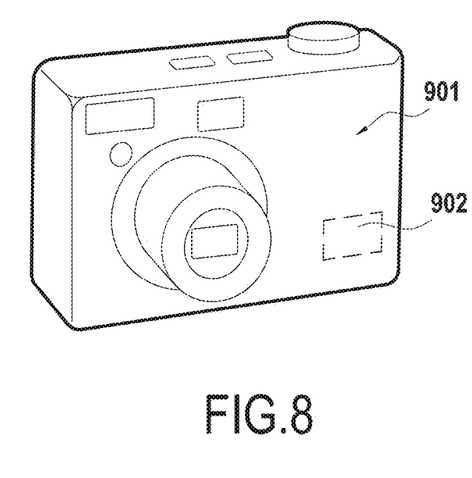
FIGS. 8 and 9 illustrate potential embodiments of video systems applying the method of FIG. 1.
Figure 9:
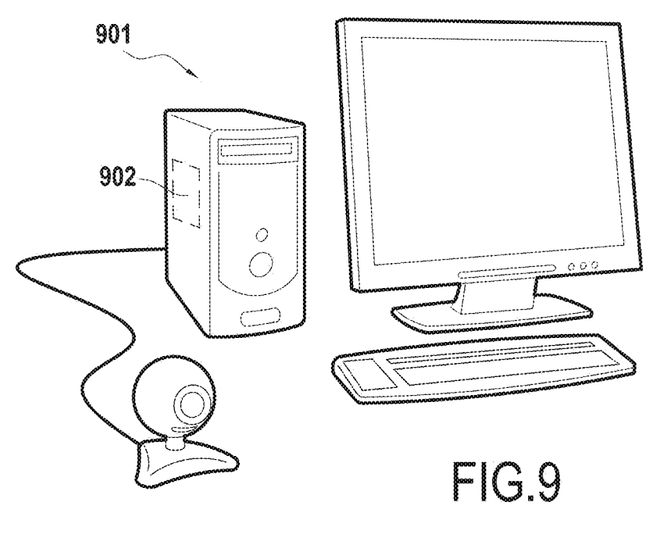

FIG. 8 illustrates a possible application of the invention with an imaging device 1 in the particular form of a digital camera with an embedded data processing device 2 programmed to carry out the method of the invention. FIG. 9 illustrates another possible application of the invention with an imaging device 1 connected to a data processing device 2 programmed to carry out the method of the invention.

Those skilled in the art will recognize that the present invention may be manifested in a variety of forms other than the specific embodiments described and contemplated herein. Accordingly, departure in form and detail may be made without departing from the scope of the present invention as described in the appended claims.

The invention claimed is:

1. A method for assigning a pixel to one of a foreground pixel set and a background pixel set to improve motion detection by an imaging device, the pixel belonging to an image of a chronological sequence of images taken by the imaging device that includes background and foreground objects, the method comprising the steps of:

initializing a baseline probability for the pixel as equal to a probability that a corresponding pixel in an initial image of the chronological sequence of images belongs to a foreground relevant object, said probability being calculated according to a semantic segmentation algorithm;

calculating a probability that the pixel belongs to a foreground-relevant object according to the semantic segmentation algorithm;

assigning the pixel to the background pixel set if the probability that the pixel belongs to a foreground-relevant object does not exceed a first predetermined threshold so as to reduce a rate of false positives, wherein false positives represent an erroneous assignment of pixels to the foreground pixel set due to one or more of dynamic backgrounds, ghosting, shadows, reflections, camera jitter, panning, tilting, zooming, inclement weather, gradual or sudden lighting changes and background displacement in the sequence of images being taken by the imaging device; further comprising the step of assigning the pixel to the foreground pixel set if the probability that the pixel belongs to a foreground-relevant object exceeds the first predetermined threshold and a difference between the probability that the pixel belongs to a foreground-relevant object and the baseline probability for the pixel equals or exceeds a second predetermined threshold so as to reduce a rate of false negatives, wherein false negatives represent an erroneous assignment of pixels to the background pixel set as can occur when at least some of the background and foreground objects in the image share similar pixel values.

2. The method as set forth in claim 1, further comprising a step of updating the baseline probability when the pixel has been assigned to the background pixel set, said baseline updating step including making the baseline probability for the pixel equal to the probability that the pixel belongs to a foreground-relevant object calculated according to the semantic segmentation algorithm.

3. The method as set forth in claim 2, wherein the baseline updating step is executed on a random basis according to a predetermined probability of execution.

4. The method as set forth in claim 1, further comprising the step of assigning the pixel to either the foreground pixel set or the background pixel set according to a background subtraction algorithm comparing a pixel value with a background model if the probability that the pixel belongs to a foreground-relevant object exceeds the first predetermined threshold and a difference between the probability that the pixel belongs to a foreground-relevant object and the baseline probability for the pixel is lower than a second predetermined threshold.

5. The method as set forth in claim 4, wherein the background model is based on at least another related image.

6. The method as set forth in claim 4, wherein the background model is based on a previous image in the chronological sequence of images.

7. The method according to claim 1, wherein the first and second predetermined thresholds have been predetermined so as to optimize an F score of the method on a test image series.

8. The method according to claim 4, wherein the first and second predetermined thresholds have been predetermined so as to optimize an F score of the method on a test image series.

9. The method as set forth in claim 1, further comprising the step of assigning the pixel to either the foreground pixel set or the background pixel set according to a background subtraction algorithm comparing a pixel value with a background model if the probability that the pixel belongs to a foreground-relevant object exceeds the first predetermined threshold and a difference between the probability that the pixel belongs to a foreground-relevant object and the baseline probability for the pixel is lower than the second predetermined threshold.

10. The method according to claim 9, wherein the first and second predetermined thresholds have been heuristically predetermined based on, respectively, a false foreground detection rate of the background subtraction algorithm and a true foreground detection rate of the background subtraction algorithm.

11. An imaging device for taking a chronological sequence of images comprising a data processing device configured to assign a pixel from an image of said chronological sequence of images to one of a foreground pixel set and a background pixel set to improve motion detection by the imaging device by reducing a rate of false positives, in which false positives represent an erroneous assignment of pixels to the foreground pixel set due to one or more of dynamic backgrounds, ghosting, shadows, reflections, camera jitter, panning, tilting, zooming, inclement weather, gradual or sudden lighting changes and background displacement in the sequence of images being taken by the imaging device, said data processing device being programmed to initialize a baseline probability for the pixel as equal to a probability that a corresponding pixel in an initial image of the chronological sequence of images belongs to a foreground relevant object, said probability being calculated according to a semantic segmentation algorithm; calculate a probability that the pixel belongs to a foreground-relevant object according to the semantic segmentation algorithm; and assign the pixel to the background pixel set if the probability that the pixel belongs to a foreground-relevant object does not exceed a first predetermined threshold; wherein said data processing device is further programmed to update the baseline probability when the pixel has been assigned to the background pixel set, updating the baseline probability including making the baseline probability for the pixel equal to the probability that the pixel belongs to a foreground-relevant object calculated according to the semantic segmentation algorithm.

12. The imaging device as set forth in claim 11, wherein said imaging device is a digital camera.

13. The imaging device as set forth in claim 11, wherein said data processing device is further programmed to assign the pixel to the foreground pixel set if the probability that the pixel belongs to a foreground-relevant object exceeds the first predetermined threshold and a difference between the probability that the pixel belongs to a foreground-relevant object and the baseline probability for the pixel equals or exceeds a second predetermined threshold so as to reduce a rate of false negatives, with false negatives representing an erroneous assignment of pixels to the background pixel set as can occur when at least some of the background and foreground objects in the image share similar pixel values.

14. The imaging device as set forth in claim 13, wherein said imaging device is a digital camera.

15. A non-transitory data storage medium comprising a set of instructions configured to be read by a data processing device, the set of instructions including a plurality of steps to be undertaken to assign a pixel, from an image of a chronological sequence of images taken by an imaging device, to one of a foreground pixel set and a background pixel set to improve motion detection by the imaging device, said plurality of steps in the set of instructions including initializing a baseline probability for the pixel as equal to a probability that a corresponding pixel in an initial image of the chronological sequence of images belongs to a foreground relevant object, said probability being calculated according to a semantic segmentation algorithm; calculating a probability that the pixel belongs to a foreground-relevant object according to the semantic segmentation algorithm; and assigning the pixel to the background pixel set if the probability that the pixel belongs to a foreground-relevant object does not exceed a first predetermined threshold, the data processing device, by following the set of instructions on the data storage medium, reducing a rate of false positives which represent an erroneous assignment of pixels to the foreground pixel set due to one or more of dynamic backgrounds, ghosting, shadows, reflections, camera jitter, panning, tilting, zooming, inclement weather, gradual or sudden lighting changes and background displacement in the sequence of images taken by the imaging device; wherein said set of instructions further directs the data processing device to assign the pixel to the foreground pixel set if the probability that the pixel belongs to a foreground-relevant object exceeds the first predetermined threshold and a difference between the probability that the pixel belongs to a foreground-relevant object and the baseline probability for the pixel equals or exceeds a second predetermined threshold so as to reduce a rate of false negatives, with false negatives representing an erroneous assignment of pixels to the background pixel set as can occur when at least some of the background and foreground objects in the image share similar pixel values.

16. The non-transitory data storage medium as set forth in claim 15, wherein said set of instructions further directs the data processing device to update the baseline probability when the pixel has been assigned to the background pixel set, updating the baseline probability including making the baseline probability for the pixel equal to the probability that the pixel belongs to a foreground-relevant object calculated according to the semantic segmentation algorithm.

* * * * *